US012205787B2

(12) United States Patent
Wong

(10) Patent No.: US 12,205,787 B2
(45) Date of Patent: Jan. 21, 2025

(54) SNAP-ACTION TYPE SWITCH

(71) Applicant: DEFOND ELECTECH CO., LTD, Guangdong (CN)

(72) Inventor: Kin Yu Wong, Dongguan (CN)

(73) Assignee: DEFOND ELECTECH CO., LTD, Guangdong (CN)

( * ) Notice: Subject to any disclaimer, the term of this patent is extended or adjusted under 35 U.S.C. 154(b) by 88 days.

(21) Appl. No.: 17/586,013

(22) Filed: Jan. 27, 2022

(65) Prior Publication Data

US 2022/0254578 A1 Aug. 11, 2022

(51) Int. Cl.
*H01H 5/00* (2006.01)
*H01H 3/38* (2006.01)
*H01H 5/06* (2006.01)
*H01H 9/02* (2006.01)

(52) U.S. Cl.
CPC ................ *H01H 5/06* (2013.01); *H01H 3/38* (2013.01); *H01H 5/00* (2013.01); *H01H 9/02* (2013.01)

(58) Field of Classification Search
CPC .. H01H 5/06; H01H 3/38; H01H 9/02; H01H 3/16; H01H 3/10; H01H 5/14; H01H 5/18
USPC ....... 200/402, 407–409, 440, 442, 449, 450, 200/451, 453, 459–461, 520
See application file for complete search history.

(56) References Cited

U.S. PATENT DOCUMENTS 3,381,197 A 4/1968 Waters et al.
4,738,506 A 4/1988 Abendschein et al.
2011/0234420 A1* 9/2011 Cutler ...................... H02G 3/14 340/815.45

(Continued)

FOREIGN PATENT DOCUMENTS

CN 105140078 A 12/2015
CN 110014400 A 7/2019

(Continued)

OTHER PUBLICATIONS

Decision of Grant a Patent for Japanese Patent Application No. 2022-008520, dated Mar. 6, 2023.

(Continued)

*Primary Examiner* — Renee S Luebke
(74) *Attorney, Agent, or Firm* — MARSHALL, GERSTEIN & BORUN LLP

(57) ABSTRACT

An snap-action type switch unit includes a switch housing; an actuator plunger configured for depressible movement via an aperture in the switch housing from a first position to a second position; a snap-action switch assembly which is operably-connected with the actuator plunger and responsive to the depressible movement of the actuator plunger so as to effect snap-action type movement of at least one movable contact between a normally opened position and a normally closed position with respect to at least one stationary contact in order to effect switching of electric power; and a signaling signaling assembly which is operably-connected with the actuator plunger and responsive to the depressible movement of the actuator plunger so as to effect movement of at least one movable conductive element of the signaling assembly amongst a plurality of different electrical contact point configurations with respect to at least one stationary conductive element of the signaling assembly.

11 Claims, 6 Drawing Sheets

(56) References Cited

U.S. PATENT DOCUMENTS

| | | | | |
|---|---|---|---|---|
| 2018/0350531 | A1 * | 12/2018 | Wong | H01H 3/12 |
| 2020/0185167 | A1 | 6/2020 | Wong | |

FOREIGN PATENT DOCUMENTS

| | | | | |
|---|---|---|---|---|
| CN | 210040014 U | | 2/2020 | |
| CN | 111292986 A | | 6/2020 | |
| DE | 3412377 | * | 10/1985 | H01H 9/06 |
| JP | 2004-082327 A | | 3/2004 | |
| JP | 2006-221908 A | | 8/2006 | |
| JP | 2007-042359 A | | 2/2007 | |
| JP | 2014-056749 A | | 3/2014 | |
| JP | 2019-121807 A | | 7/2019 | |

OTHER PUBLICATIONS

Search Report for Hong Kong Application No. 32021024929.0, dated Feb. 8, 2021.

First Chinese Office Action for Application No. 202111649626.1, dated Jul. 10, 2023.

* cited by examiner

SNAP-ACTION TYPE SWITCH

CROSS-REFERENCE TO RELATED APPLICATION

The present disclosure claims the priority to the Hong Kong Patent Application with the filing No. 320210249290, filed on Feb. 5, 2021 with the Hong Kong Intellectual Property Department, and entitled "A Snap-action Type Switch", the contents of which are incorporated herein by reference in entirety.

TECHNICAL FIELD

The present disclosure relates to snap-action type switches, particularly to a miniature snap-action type switch.

BACKGROUND ART

A miniature snap-action type switch, also commonly referred to as a "Micro-Switch"®, is an electric switch including an actuator member such as a depressible plunger or button, which requires a relatively small force to actuate it. Actuation of the plunger results in a snap-action type or over-center type movement of the electrical contacts of the switch between a normally opened position and a normally closed position. Such switches are compact in size and typically employed in precision control applications due to their reliability in effecting switching at specific and repeatable positions of the plunger.

In certain applications, such as in electric power tools, where both variable speed/torque control signaling and electrical current switching functions are required, the existing practice has been to mount two such standard sized snap-action switches together in stacked fashion which may each be actuated separately via linear movement of their respective separate actuator plungers in response to squeezing of a trigger to effect variable speed/torque signaling and electric current switching respectively. However, there are several problems associated with this conventional approach. Firstly, the resulting configuration of the stacked snap-action switches is a relatively bulky configuration and results in poor spatial utilisation of the relatively compact power tool housing (particularly if it is a hand-held tool). Secondly, due to the size and bulkiness of the stacked arrangement, assembly and installation of the two mounted snap-action switches on to a PCB involves greater assembly/installation complexity. Thirdly, because the stacked snap-action switches are separately actuated by their respective separate actuator plungers, the operation of the stacked micro-switches tend to be poorly synchronized, while the synchronization is a crucial requirement for usage in electric power tools.

SUMMARY

The present disclosure seeks to alleviate at least one of the above-described problems.

The present disclosure may involve several broad forms. Embodiments of the present disclosure may include one or any combination of the different broad forms herein described.

In one broad form, the present disclosure provides a snap-action type switch unit for use with an electrical appliance, including:

a switch housing;

an actuator plunger, which may be configured for performing depressible movement, via an aperture in the switch housing, from a first position to a second position, wherein in the first position, the plunger may extend via the aperture outward relative to the switch housing, and in the second position, the actuator plunger may be retracted via the aperture inwardly relative to the switch housing;

a snap-action switch assembly, which may be operably-connected with the actuator plunger, wherein the snap-action switch assembly may be responsive to the depressible movement of the actuator plunger so as to effect snap-action type movement of at least one movable contact between a normally opened position and a normally closed position with respect to at least one stationary contact in order to effect switching of electric power via the snap-action switch assembly; and a signaling assembly, which may be operably-connected with the actuator plunger, wherein the signaling assembly may be responsive to the depressible movement of the actuator plunger, so as to effect movement of at least one movable conductive element of the signaling assembly amongst a plurality of different electrical contact point configurations with respect to at least one stationary conductive element of the signaling assembly, whereby a characteristic of operation of the electrical appliance is able to be varied by reference to the movement of the at least one movable conductive element amongst the different electrical contact point configurations with respect to the at least one stationary conductive element.

Optionally, the characteristic of operation of the electrical appliance that is able to be varied may include a speed or torque of an electric motor of the electrical appliance.

Further optionally, the characteristic of operation of the electrical appliance that is able to be varied may include an output of at least one of an electronic display, a light emitting device, and a sound-emitting device of the electrical appliance.

Optionally, when at least one movable conductive element of the signaling assembly moves amongst a plurality of different electrical contact point configurations with respect to at least one stationary conductive element of the signaling assembly, different electrical outputs are readable from the signaling assembly.

Optionally, the at least one movable conductive element of the signaling assembly may include at least one of an electrically conductive wiper of a potentiometer and a movable electrical contact, and the at least one stationary conductive element may include at least one of an electrically conductive pad of a potentiometer and a stationary electrical contact.

Optionally, the signaling assembly may include a potentiometer having an electrically conductive wiper and an electrically conductive pad, the electrically conductive wiper as a movable conductive element is responsive to movement of the actuator plunger so as to slide across the electrically conductive pad as a stationary conductive element amongst a plurality of different electrical contact point configurations, so that different electrical outputs are readable from the signaling assembly when current passes from the electrically conductive wiper across different electrical contact points on the electrically conductive pad.

Optionally, the signaling assembly may include: a movable contact plate, wherein the movable contact plate as the movable conductive element is able to effect movement relative to a pair of stationary contacts as the stationary conductive element in response to movement of the actuator plunger, so as to effect opening and closing in relation to the stationary contacts; and a biasing spring which is able to urge the movable contact plate into an opened state in relation to the stationary contacts.

Optionally, the snap-action switch assembly and the signaling assembly may be separated by a wall disposed within the housing. Further optionally, the wall may be integrally formed with the housing.

Optionally, the present disclosure may include a sliding carriage member operably-connected with the actuator plunger, wherein the sliding carriage member is slidably movable within the housing in response to depressible movement of the actuator plunger so as to effect movement of at least one movable conductive element of the signaling assembly and to effect movement of the movable contact of the snap-action switch assembly for operation of the signaling assembly and of the snap-action switch assembly.

Optionally, the electrically conductive wiper may be disposed on a PCB within the switch housing, and the electrically conductive wiper may be mounted on the sliding carriage member, so that when the actuator plunger is moved inwardly and outwardly via the aperture with respect to the housing, the electrically conductive wiper is moved by the sliding carriage member to a plurality of different electrical contact point configurations of the electrically conductive pad.

Optionally, at least one movable conductive element of the signaling assembly may be mounted on the sliding carriage member.

Optionally, the present disclosure may include a return spring that may be operably-connected with the actuator plunger so as to urge the actuator plunger to a relatively extended position after the actuator plunger is inwardly depressed.

Optionally, the present disclosure may include a sealing element that may be configured for being arranged around the actuator plunger to occlude ingress of particulates, dust, and water from entering the housing via the aperture.

Optionally, the present disclosure may include a ring-shaped securement element configured to secure the sealing element to the housing, wherein the securement element has a plurality of tabs or flaps extending away from a rim of the securement element at spaced-apart intervals, and the tabs or flaps are configured for interference-fitting engagement with an annular recess of the aperture, so as to firmly press a flanged portion of the sealing element into the annular recess.

Optionally, the present disclosure may include a pair of electrical signaling wires that may have respective first ends configured for being in electrical communication with the signaling assembly and respective second ends that extend outwardly of the housing for connection with an external processing device.

Optionally, the external processing device may control operation of the electrical appliance by reference to electrical signals sensed from the signaling assembly.

Optionally, the switch housing may include a central body, and a top cover and a lower cover that may be disposed on two opposed sides of the central body respectively. Optionally, the central body may include an internal wall that may be provided between a top compartment and a lower compartment so as to provide at least partial physical separation therebetween, wherein the top compartment is formed between the top cover and the central body, and the lower compartment is formed between the lower cover and the central body.

Optionally, the housing may have dimensions of approximately 27.8 mm×10.3 mm×15.9 mm.

The embodiments of the present disclosure can realize, for example, the following beneficial effects.

The snap-action type switch provided in the embodiments of the present disclosure is provided of comparable compact size to current snap-action type switches in which both signaling assembly and power switching assembly are integrally housed. This alleviates the need to stack 2 separate standard sized snap-action type switches together for use in providing signaling and power switching operations. Secondly, the signaling assembly and power switching assembly are configured for operation by movement of a single common actuator. This results in improved synchronisation of the signaling and power switching operations by virtue of actuation by the single common actuator. Conveniently, the integrally formed wall within the housing also assists in electrically isolating the signaling assembly from the power switching assembly so as to alleviate mis-operation of the device. Also, by compactly housing both the signaling assembly and the power switching assembly together within a housing comparable to a standard sized snap-action type switch and with only a single aperture being required for receiving a single actuator plunger, this alleviates the potential ingress points for liquids, dust, and other particulates. Such devices made in accordance with such embodiments of the present disclosure may thereby assist in better meeting ingress protection standards such as IP67 and the like.

BRIEF DESCRIPTION OF DRAWINGS

The present disclosure will become more fully understood from the following detailed description of optional but non-limiting embodiments thereof, described in connection with the accompanying drawings, wherein.

Figure 1A:
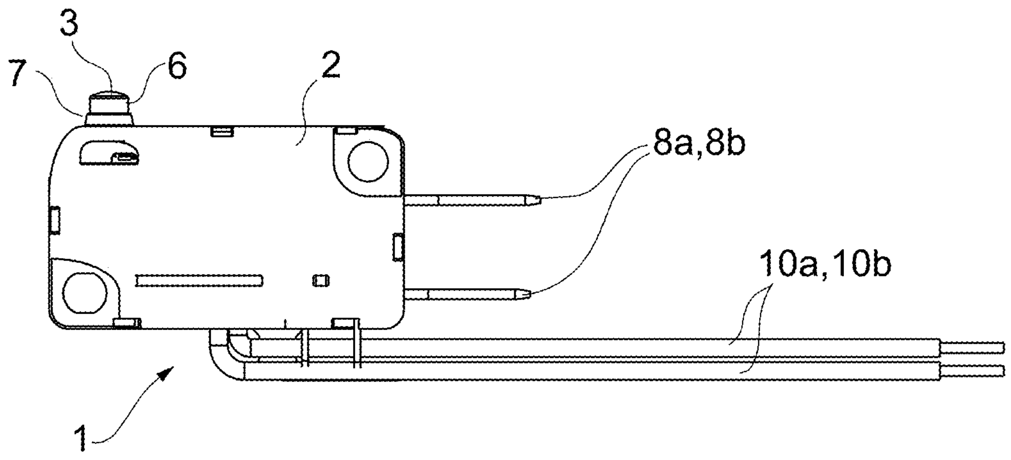
FIG. 1A shows a left-side view of a miniature snap-action type switch in accordance with an embodiment of the present disclosure.
Figure 1B:
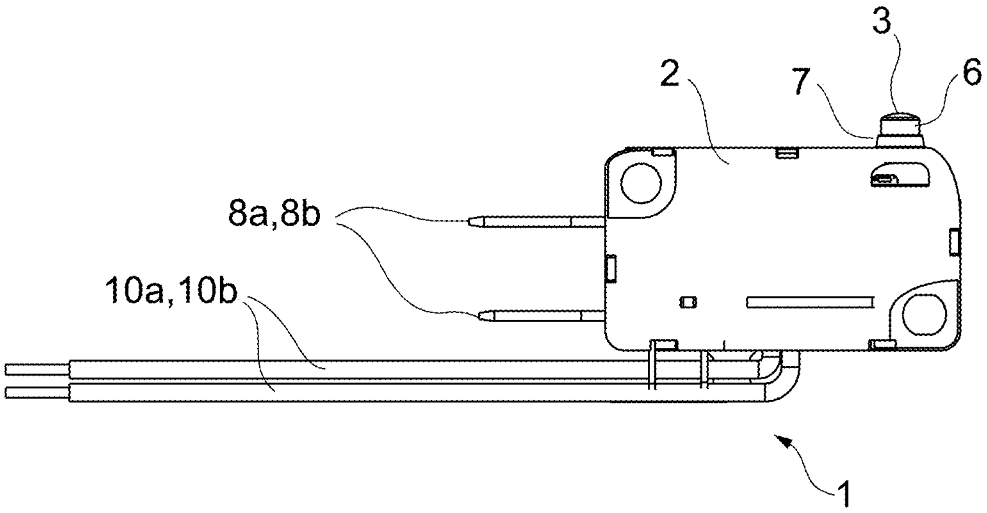
FIG. 1B shows a right-side view of the miniature snap-action type switch in accordance with an embodiment of the present disclosure.
Figure 1C:
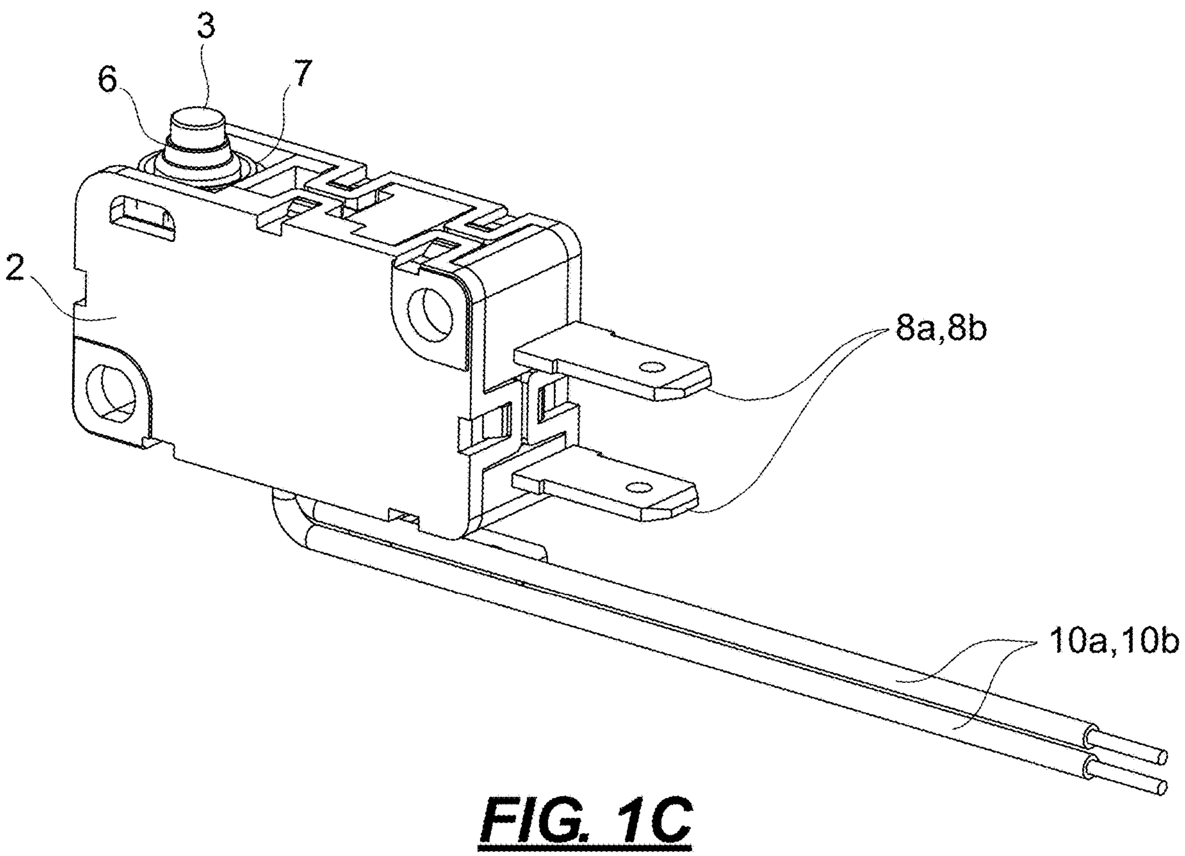
FIG. 1C shows a perspective view of the miniature snap-action type switch in accordance with an embodiment of the present disclosure.
Figure 2:
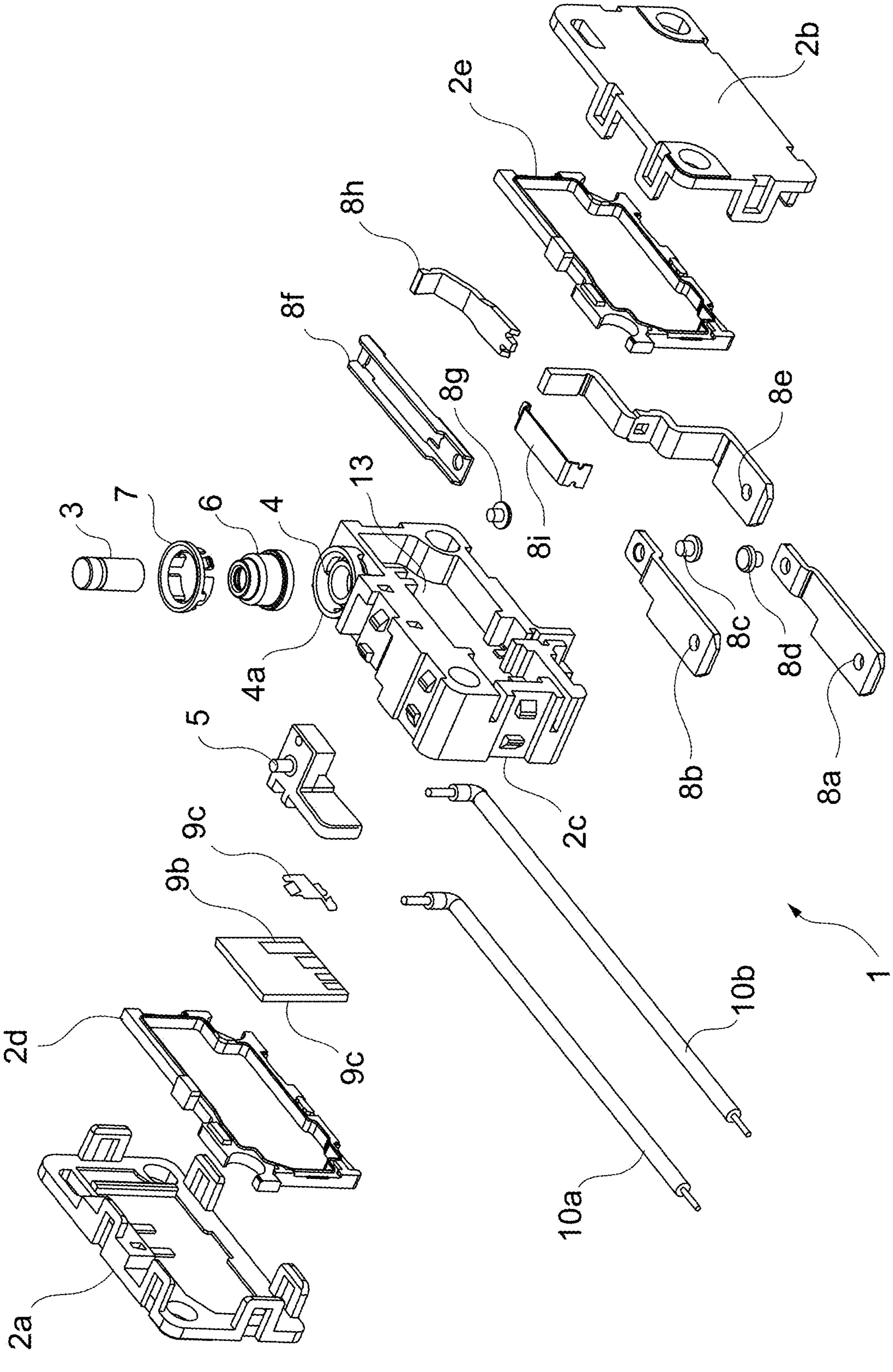
FIG. 2 shows an exploded perspective view of a miniature snap-action type switch in accordance with an embodiment of the present disclosure.
Figure 3A:
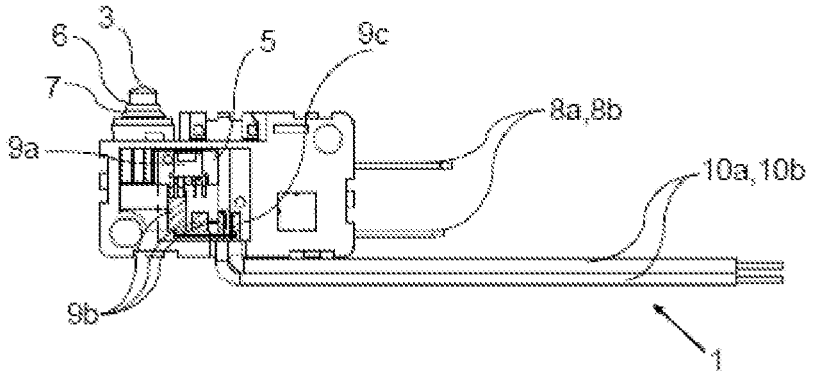
FIG. 3A shows an assembled left-side sectional view of the miniature snap-action type switch of FIG. 2, in accordance with an embodiment of the present disclosure.
Figure 3B:
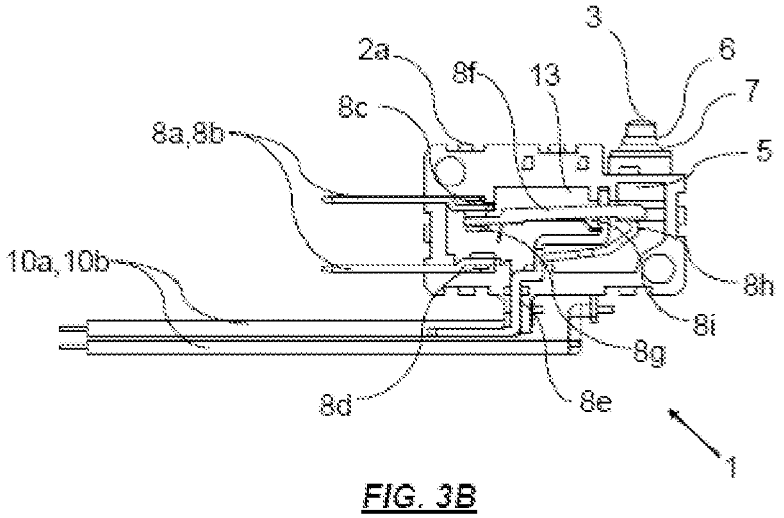
FIG. 3B shows an assembled right-side sectional view of the miniature snap-action type switch of FIG. 2, in accordance with an embodiment of the present disclosure.

Reference signs: 1—snap-action type switch unit; 2—switch housing; 2*a*—top cover; 2*b*—lower cover; 2*c*—central body; 2*d*—top cover rubber seal; 2*e*—lower cover rubber seal; 3—actuator plunger; 4—aperture; 4*a*—annular recess; 5—sliding carriage member; 6—sealing element; 7—securement element; 8*a*—normally-opened terminal (NO); 8*b*—normally-closed terminal (NC); 8*c*, 8*d*—stationary electrical contact; 8*e*—common terminal; 8*f*—contact lever; 8*g*—movable contact; 8*h*—yoke; 8*i*—leaf spring; 9*a*—electrically conductive wiper; 9*b*—electrically conductive pad; 9*c*—PCB; 10*a*, 10*b*—signaling wire; 11*a*—movable contact plate; 11*b*, 11*c*—stationary contact.

DETAILED DESCRIPTION OF EMBODIMENTS

In order to make the objectives, technical solutions, and advantages of the embodiments of the present disclosure clearer, the technical solutions in the embodiments of the present disclosure will be described below in combination with the accompanying drawings in the embodiments of the present disclosure. Apparently, some but not all embodiments of the present disclosure are described. Based on the embodiments in the present disclosure, all of other embodiments, obtained by a person ordinarily skilled in the art without using creative efforts, shall fall within the scope of protection of the present disclosure.

Optional embodiments of the present disclosure will now be described herein with reference to FIG. 1 to FIG. 5B. The embodiments include miniature snap-action type switches for use with machines and electrical appliances, such as electric tools and gardening tools, door interlocks, elevators, vending machines, automotive electronics, home appliances, testing equipment, small appliances, medical equipment, and building automation. Optionally, in other embodiments, the snap-action type switch housings may not necessarily be miniature type housings and may vary in size and dimension.

Referring firstly to FIG. 1A to FIG. 3B, it describes a miniature snap-action type switch unit 1 for use with an electrical appliance in accordance with an embodiment of the present disclosure. The miniature snap-action type switch may include a switch housing 2 that may have dimensions of approximately 27.8 mm×10.3 mm×15.9 mm. In these embodiments, the switch housing 2 may include a top cover 2*a* and a lower cover 2*b* that may be screwed to a central body 2*c* on two opposed sides of the central body 2*c*. The top cover 2*a*, the lower cover 2*b*, and the central body 2*c* typically may be molded from Nylon, POM (Polyoxymethylene) or some other suitable rigid polymeric material. The central body 2*c* may include an internal wall 13 that is integrally formed therein, wherein the internal wall may provide at least partial physical separation between a space between the top cover 2*a* and the central body 2*c*, i.e. the top compartment, and a space between the lower cover 2*b* and the central body 2*c*, i.e. the lower compartment. A top cover rubber seal 2*d* may be disposed between the top cover 2*a* and the central body 2*c*, and, a lower cover rubber seal 2*e* may be similarly disposed between the lower cover 2*b* and the central body 2*c*, when the housing 2 is assembled.

A cylindrical-shaped actuator plunger 3 may be configured for depressible movement via a circular-shaped aperture 4 in the central body 2*c* of the switch housing 2 from a first position to a second position, wherein the in the first position, the actuator plunger 3 may be relatively extended outwardly via the aperture 4, and in the second position, the actuator plunger 3 may be relatively retracted inwardly with respect to the housing 2 via the aperture 4. A return spring may be operably-connected with the actuator plunger 3 so as to urge the actuator plunger 3 to the relatively extended position after being inwardly depressed. The actuator plunger 3 may be rigidly-connected with a sliding carriage member 5 located within the housing 2, wherein the sliding carriage member may be configured for performing linear slidable movement within the housing 2 together with the actuator plunger 3 when the actuator plunger moves inwardly and outwardly via the aperture 4.

A sealing element 6 may be configured for being arranged around the actuator plunger 3 to occlude ingress of particulates, dust, and water from entering the housing 2 via the aperture 4. The sealing element 6 may include a sleeve which may have a flanged portion at one end of the sleeve, wherein the flanged portion may be configured for securement to the housing 2. The actuator member may be configured to fit snugly within a hollow core of the sleeve so that it may slide up and down through the core of the sleeve when the actuator plunger 3 is depressed inwardly via the aperture 4 in the housing 2 and when the actuator plunger retracts outwardly via the aperture 4 in the housing 2. In this embodiment, the sealing element 6 may be molded from a rubber or an elastically-resilient polymeric material such as silicone and the like. A ring-shaped securement element 7 may be sized and dimensioned to allow the actuator plunger 3 to pass therethrough. In this embodiment, the ring-shaped securement element 7 may be formed from nylon or any other suitable rigid material. A plurality of tabs or flaps may extend away from a rim of the securement element 7 at spaced-apart intervals which may be shaped and dimensioned for interference-fitting engagement with an annular recess 4*a* that may be disposed around a periphery of the aperture in the housing. In doing so, the tabs or flaps may firmly press the flanged portion of the sealing element into the annular recess 4*a* and in doing so, the scaling element 6 may be secured to the housing 2.

A snap-action switch assembly 8 may be located in the lower compartment of the housing 2 and may include a normally-opened terminal (NO) 8*a*, a normally-closed terminal (NC) 8*b*, wherein each terminal may have stationary electrical contacts 8*c*, 8*d* mounted thereon. The snap-action switch assembly 8 also may include a common terminal 8*e* and a contact lever 8*f*, and the contact lever may have a movable contact 8*g* mounted thereon. The contact lever 8*f* may be in continuous electrical communication with the common terminal 8*e*, and when a force is applied to the contact lever 8*f* by the actuator plunger 3 (either directly or via the sliding carriage member), a yoke 8*h* and a leaf spring 8*i* may cooperate to enable the contact lever 8*f* to pivot about the common terminal 8*e* in snap-action type movement. In this way, the movable contact 8*g* may be selectively switched to be in electrical communication with the stationary contact of the NO 8*a* or in electrical communication with the stationary contact of NC 8*b*. In this embodiment, when the actuator plunger 3 is in its rest state (i.e. when it is retracted outwardly via the housing aperture by the return spring), the contact lever 8*f* may be configured to move the movable contact 8*g* to be in electrical communication with the NC stationary contact 8*c*. Conversely, when the actuator plunger 3 is urged relatively inwardly via the housing aperture 4, the contact lever 8*f* may be moved to a position where the movable contact 8*g* is in electrical communication with the NO stationary contact 8*d*.

The miniature snap-action type switch 1 also may include a signaling assembly 9 operably-connected with the actuator plunger 3. The signaling assembly 9 may be located in the top compartment of the housing 2 and may include a potentiometer having an electrically conductive wiper 9*a* and an electrically conductive pad 9*b*. The electrically conductive wiper 9*a* may be movable in response to movement of the actuator plunger 3, so as to slide across the electrically conductive pad amongst a plurality of different electrical contact point configurations upon the electrically conductive pad 9*b*. A characteristic of operation of the electrical appliance is able to be varied by reference to the movement of the electrically conductive wiper 9*a* amongst the different electrical contact point configurations with respect to the electrically conductive pad 9*b*, wherein the movement above of the electrically conductive wiper results in different electrical outputs being readable from the signaling assembly 9 as a current passes from the electrically conductive wiper 9*a* across the different contact points of the electrically conductive pad 9*b*. Such characteristics of operation may include varying a speed or torque of an electrical motor of the electrical appliance with which the micro-switch is being used, or, may include varying the output of at least one of an electronic display, a light emitting device, and a sound-emitting device of the electrical appliance. In this embodiment, the electrically conductive pad 9*b* may be disposed on a PCB 9*c* within the top compartment of the housing 2*a* whilst the electrically conductive wiper 9*a* may be mounted on the sliding carriage member 5 that is operably-connected with the actuator plunger 3. As the actuator plunger 3 is moved inwardly and outwardly via the housing aperture 4, the electrically conductive wiper 9*a* may be moved by the sliding carriage member 5 to the plurality of different electrical contact point configurations of the electrically conductive pad 9*b* disposed on the PCB 9*c*. A pair of electrical signaling wires 10*a*, 10*b* may have respective first ends configured for being in electrical communication with the electrically conductive wiper 9*a* and electrically conductive pad 9*b*, and respective second ends that extend outwardly of the housing 2 for being connected with an external processing device, wherein the external processing device may control operation of the electrical appliance by reference to the electrical signals sensed from the signaling assembly 9.

Figure 4:
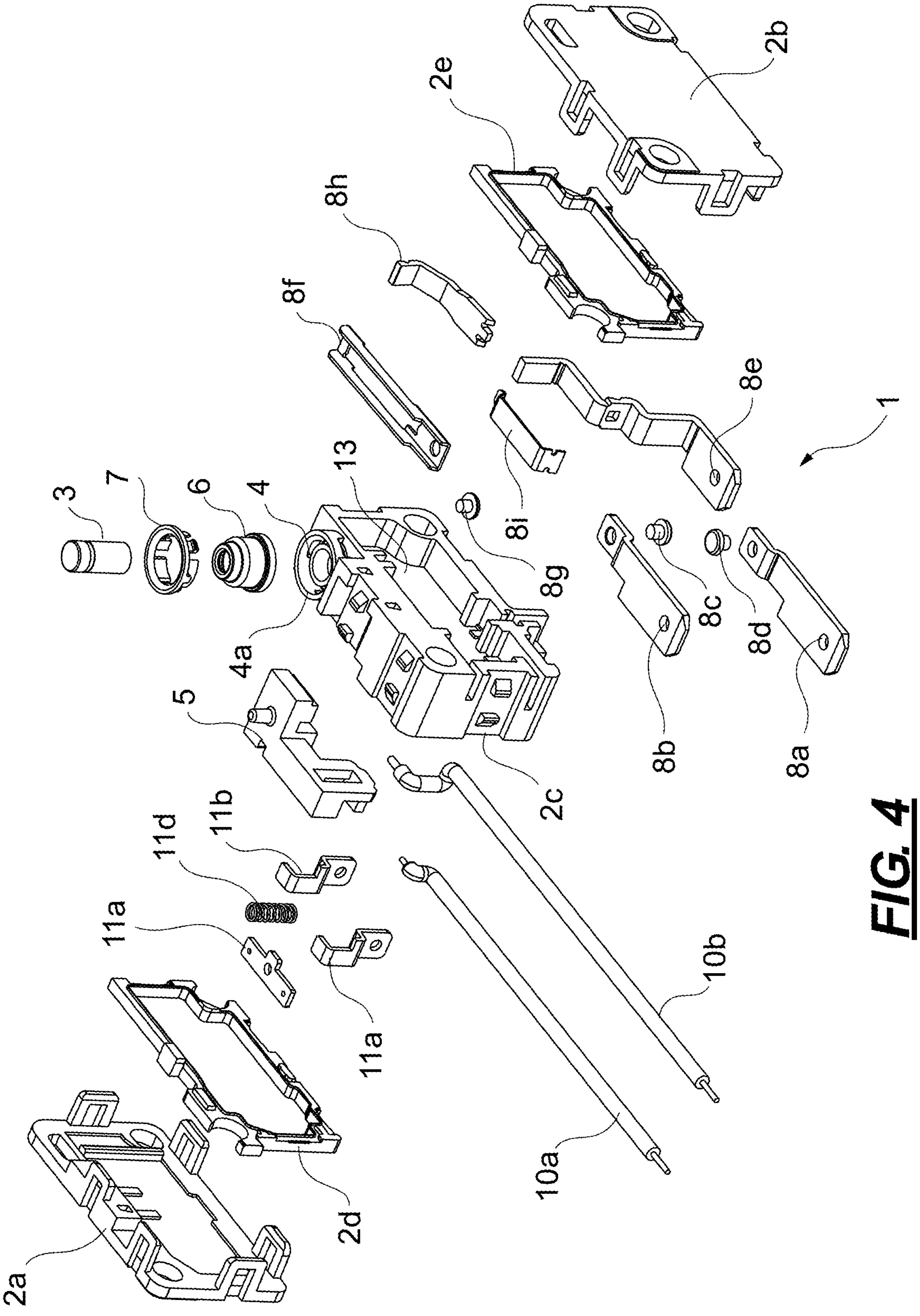
FIG. 4 shows an exploded perspective view of a miniature snap-action type switch in accordance with a further embodiment of the present disclosure.
Figure 5A:
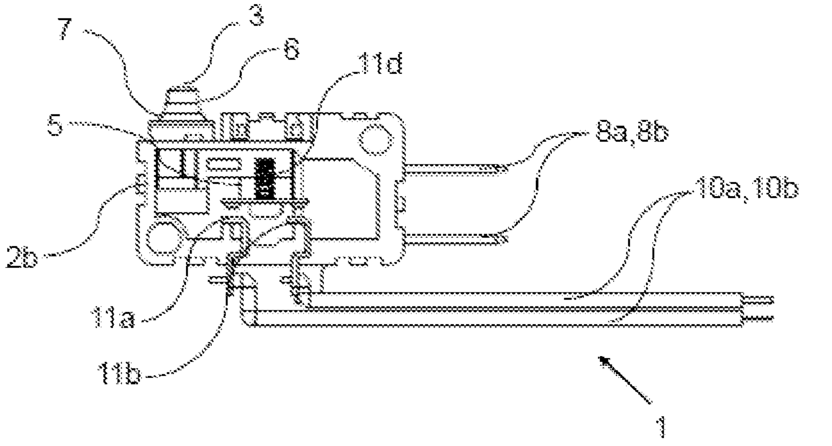
FIG. 5A shows an assembled left-side sectional view of the miniature snap-action type switch of FIG. 4, in accordance with an embodiment of the present disclosure.
Figure 5B:
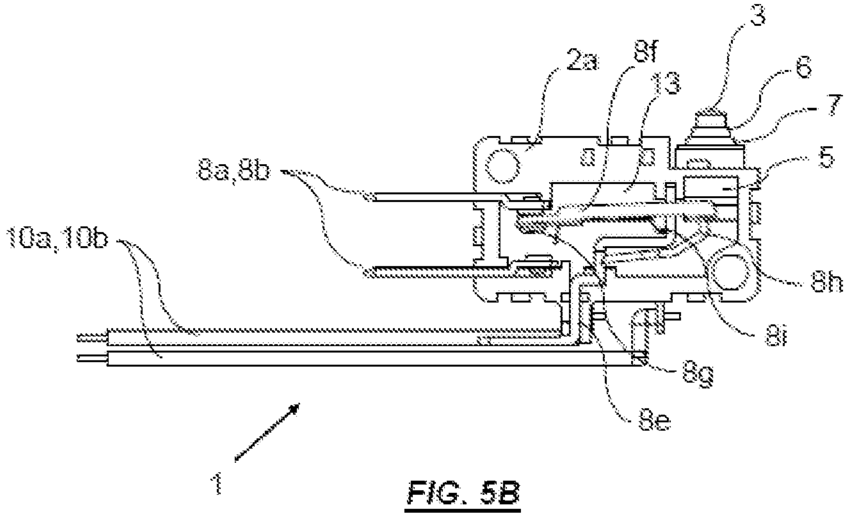
FIG. 5B shows an assembled right-side sectional view of the miniature snap-action type switch of FIG. 4, in accordance with an embodiment of the present disclosure.

Optionally, in certain embodiments as depicted in FIG. 4, FIG. 5A, and FIG. 5B, the signaling assembly may not necessarily include a potentiometer and instead may include a secondary switch assembly having a movable switch contact that may move in response to movement of the actuator and/or sliding carriage member amongst a plurality of different operational states to effect variable speed/torque control or to effect changes in an output of an output device (e.g. an audio alarm, light emitter, electronic display, etc.). The secondary switch assembly may include a movable contact plate 11*a* that may be movable in relation to a pair of stationary contacts 11*b*, 11*c* and a biasing spring 11*d* which may urge the movable contact plate 11*a* into an opened state in relation to the stationary contacts 11*b*, 11*c*. Optionally, the movable contact plate 11*a* may be mounted also on the sliding carriage member 5 so as to move upwardly and downwardly in response to the actuation of the actuator plunger 4. Opening and closing of the movable contact plate 11*a* in relation to the stationary contacts 11*b*, 11*c* may provide at least binary options for signaling operation/controlling operation of the external output device via the signaling wires 10*a*, 10*b*.

It may be apparent from the above-described embodiments that at least one advantage may be provided over the existing prior art. Firstly, a snap-action type switch is provided of comparable compact size to current snap-action type switches in which both signaling assembly and power switching assembly are integrally housed. This alleviates the need to stack 2 separate standard sized snap-action type switches together for use in providing signaling and power switching operations. Secondly, the signaling assembly and the power switching assembly are configured for operation by movement of a single common actuator. This results in improved synchronisation of the signaling and power switching operations by virtue of actuation by a single common actuator. Conveniently, the integrally formed wall within the housing also assists in electrically isolating the signaling assembly from the power switching assembly so as to alleviate mis-operation of the device. Also, by compactly housing both the signaling assembly and the power switching assembly together within a housing comparable to a standard sized snap-action type switch and with only a single aperture being required for receiving a single actuator plunger, this alleviates the potential ingress points for liquids, dust, and other particulates. Such devices made in accordance with such embodiments of the present disclosure may thereby assist in better meeting ingress protection standards such as IP67 and the like.

Any one of the features of the embodiments described herein referred to as a "module" may be implemented in software for execution by various types of processors. An identified module of executable code may, for instance, include one or more physical or logical blocks of computer instructions which may, for instance, be organised as an object, procedure, function, or algorithm. The identified blocks of computer instructions need not be physically located together, but may include disparate instructions stored in different locations which, when joined logically together, includes the module and achieves the stated purpose for the module. A module may also be implemented as a hardware circuit including custom circuits or gate arrays, off-the-shelf semiconductors such as logic chips, transistors, or other discrete components. A module may also be implemented in programmable hardware devices such as field programmable gate arrays, programmable array logic, programmable logic devices or the like. A module of executable code may include a single instruction, multiple instructions, and may be distributed over several different code segments, among different programs, and across several discrete memory devices. Similarly, operational data may be identified and illustrated herein within modules, and may be embodied in any suitable form and organised within any suitable type of data structure. The operational data may be collected as a single data set, or may be distributed over different locations including over different storage devices, and may exist, at least partially, merely as electronic signals on a system or network.

It is noted that, when a component is described to be "fixed", "coupled", "attached", "engaged", "connected" or the like to another component, it may be directly fixed to the another component or there may be an intermediate component unless expressly or implicitly stated to the contrary. When a component is described to be "disposed" on or in another component, it can be directly disposed on or in the another component or there may be an intermediate component unless expressly or implicitly stated to the contrary.

Unless otherwise specified, all technical and scientific terms have the ordinary meaning as commonly understood by persons skilled in the art. The terms used in the present disclosure are illustrative rather than limiting. The term "and/or" used in the present disclosure means that each and every combination of one or more associated items listed may be included.

Those skilled in the art will appreciate that the present disclosure described herein is susceptible to variations and modifications other than those specifically described without departing from the scope of the present disclosure. All such variations and modification, which become apparent to persons skilled in the art, should be considered to fall within the spirit and scope of the present disclosure as broadly hereinbefore described. It is to be understood that the present disclosure includes all such variations and modifications. The present disclosure also includes all of the steps and features, referred or indicated in the specification, individually or collectively, and any and all combinations of any two or more of the steps or features.

The reference to any prior art in the present specification is not, and should not be taken as, an acknowledgment or any form of suggestion that the prior art forms part of the common general knowledge.

INDUSTRIAL APPLICABILITY

The snap-action type switch provided in the embodiments of the present disclosure has comparable compact size to current snap-action type switches in which both signaling assembly and power switching assembly are integrally housed. This alleviates the need to stack 2 separate standard sized snap-action type switches together for use in providing signaling and power switching operations. Secondly, the signaling assembly and the power switching assembly are configured for operation by movement of a single common actuator. This results in improved synchronisation of the signaling and power switching operations by virtue of actuation by a single common actuator. Conveniently, the integrally formed wall within the housing also assists in electrically isolating the signaling assembly from the power switching assembly so as to alleviate mis-operation of the device. Also, by compactly housing both signaling assembly and power switching assembly together within a housing comparable to a standard sized snap-action type switch, with only a single aperture being required for receiving a single actuator plunger, this alleviates the potential ingress points for liquids, dust, and other particulates. Such devices made in accordance with such embodiments of the present disclosure may thereby assist in better meeting ingress protection standards such as IP67 and the like.

What is claimed is:

1. A snap-action switch unit configured for use with an electrical appliance, comprising:

a switch housing;

an actuator plunger, which is configured for depressible movement via an aperture in the switch housing from a first position to a second position, wherein in the first position, the plunger is extended outwardly via the aperture relative to the switch housing, and in the second position, the actuator plunger is retracted inwardly via the aperture relative to the switch housing;

a snap-action switch assembly, which is operably-connected with the actuator plunger, wherein the snap-action switch assembly is responsive to the depressible movement of the actuator plunger so as to effect snap-action movement of at least one movable contact between a normally opened position and a normally closed position with respect to at least one stationary contact in order to effect switching of electric power via the snap-action switch assembly; and a signaling assembly, which is operably-connected with the actuator plunger, wherein the signaling assembly is responsive to the depressible movement of the actuator plunger so as to effect movement of at least one movable conductive element of the signaling assembly amongst a plurality of different electrical contact point configurations with respect to at least one stationary conductive element of the signaling assembly, whereby a characteristic of operation of the electrical appliance is able to be varied by reference to the movement of the at least one movable conductive element amongst the different electrical contact point configurations with respect to the at least one stationary conductive element;

wherein when the at least one movable conductive element of signaling assembly moves amongst the plurality of different electrical contact point configurations with respect to the at least one stationary conductive element of the signaling assembly, different electrical outputs are readable from the signaling assembly;

wherein the signaling assembly comprises a potentiometer having an electrically conductive wiper and an electrically conductive pad, the electrically conductive wiper, as the movable conductive element, is responsive to the movement of the actuator plunger so as to slide across the electrically conductive pad as the stationary conductive element amongst the plurality of different electrical contact point configurations on the electrically conductive pad, so that different electrical outputs are readable from the signaling assembly when a current passes from the electrically conductive wiper across different electrical contact points on the electrically conductive pad; and wherein the snap-action switch comprises a sliding carriage member operably-connected with the actuator plunger, wherein the sliding carriage member is slidably movable within the housing in response to the depressible movement of the actuator plunger so as to effect movement of the at least one movable conductive element of the signaling assembly and to effect movement of the movable contact of the snap-action switch assembly for operation of the signaling assembly and of the snap-action switch assembly.

2. The snap-action switch unit as claimed in claim 1, wherein the characteristic of operation of the electrical appliance that is able to be varied comprises a speed or torque of an electric motor of the electrical appliance.

3. The snap-action switch unit as claimed in claim 1, wherein the characteristic of operation of the electrical appliance that is able to be varied comprises an output of at least one of an electronic display, a light emitting device, and a sound-emitting device of the electrical appliance.

4. The snap-action switch unit as claimed in claim 1, wherein the snap-action switch assembly and the signaling assembly are separated by a wall disposed within the housing.

5. The snap-action switch unit as claimed in claim 4, wherein the wall is integrally formed with the housing.

6. The snap-action switch unit as claimed in claim 1, wherein the electrically conductive wiper is disposed on a PCB within the switch housing, and the electrically conductive wiper is mounted on the sliding carriage member, so that when the actuator plunger is moved inwardly and outwardly via the aperture with respect to the housing, the electrically conductive wiper is moved by the sliding carriage member to a plurality of different electrical contact point configurations of the electrically conductive pad.

7. The snap-action switch unit as claimed in claim 1, wherein the at least one movable conductive element of the signaling assembly is mounted on the sliding carriage member.

8. The snap-action switch unit as claimed in claim 1, comprising a sealing element configured for being arranged around the actuator plunger to occlude ingress of particulates, dust, and water from entering the housing via the aperture.

9. The snap-action switch unit as claimed in claim 8, comprising a ring-shaped securement element configured to secure the sealing element to the housing, wherein the securement element has a plurality of tabs or flaps extending away from a rim of the securement element at spaced-apart intervals, and the tabs or flaps are configured for interference-fitting engagement with an annular recess of the aperture, so as to firmly press a flanged portion of the sealing element into the annular recess.

10. The snap-action switch unit as claimed in claim 9, comprising a pair of electrical signaling wires, wherein the pair of electrical signaling wires have respective first ends configured for being in electrical communication with the signaling assembly and respective second ends configured for extending outwardly of the housing to be connected with an external processing device.

11. The snap-action switch unit as claimed in claim 1, wherein the housing has dimensions of approximately 27.8 mm×10.3 mm×15.9 mm.

* * * * *